United States Patent Office 3,526,494
Patented Sept. 1, 1970

3,526,494
METHOD FOR INHIBITING THE NITRIFICATION OF AMMONIUM NITROGEN IN SOIL
Haruo Toyoda, Chigasaki, Toshihiko Kakizaki, Fujisawa, Akira Hirose, Yokohama, and Tetsuichi Shinozawa, Chigasaki, Japan, assignors to Matsui Toatsu Chemicals Incorporated, Tokyo, Japan, a corporation of Japan
No Drawing. Filed Nov. 15, 1967, Ser. No. 683,158
Claims priority, application Japan, Dec. 6, 1966, 41/79,556
Int. Cl. C05c 9/00
U.S. Cl. 71—30                 5 Claims

ABSTRACT OF THE DISCLOSURE

The nitrification of ammonium nitrogen in soil is inhibited by treating the soil in a plant growing area with a reaction product of sulfathiazole with formaldehyde.

---

This invention relates to a method of inhibiting the nitrification of ammonium nitrogen in soil and a fertilizer composition therefor.

Since most plants obtain the greater part or all of nitrogen requirements from the soil, it is one of the most important agricultural problems to provide nutrient nitrogen for the growth of plants in soil. Nitrogen in soil is present in three forms of organic nitrogen, ammonium nitrogen and nitrate nitrogen. Among them, ammonium nitrogen and nitrate nitrogen are readily absorbed from soil and utilized by plants.

The organic nitrogen in soil consists of various compounds and originates from manure, organic fertilizers and crop residues. Except such organic reduced nitrogen fertilizer as urea, those compounds are generally so insoluble in water as not to be readily leached from soil, but they are not directly available to the plants for use. In order to be available to the plants, the organic nitrogen must be converted to ammonia or ammonium salts by soil bacteria. Such conversion occurs very quickly in the case of such organic reduced nitrogen fertilizer as urea, but very slowly in the case of other organic nitrogen compounds. Subsequent to the conversion, ammonium nitrogen is very quickly oxidized into inorganic nitrate nitrogen by soil bacteria. Such mineralization of organic nitrogen constantly feeds soil with nitrogen which can be utilized by plants.

The ammonium nitrogen in soil is derived from bacterial conversion of organic nitrogen, or from added reduced nitrogen fertilizers such as anhydrous ammonia, aqueous ammonia, ammonium sulfate, ammonium nitrate and ammonium phosphate. These ammonium compounds are readily soluble in water or aqueous soil medium to produce ammonium ion. As soil acts as a kind of cation exchanger, ammonium ion is strongly adsorbed by soil and is held in soil due to the cationic nature of this ion.

The nitrate nitrogen in soil is derived from nitrification of ammonium nitrogen by soil bacteria or from added inorganic nitrate fertilizers such as sodium nitrate, ammonium nitrate or calcium nitrate. These nitrate compounds are readily soluble in water or aqueous soil medium to produce nitrate ion. Due to the anionic nature of this ion, nitrate ion is not adsorbed by soil. Therefore, the nitrate nitrogen is quickly leached by rainfall or irrigation and is readily lost. Further, the nitrate nitrogen is reduced to nitrogen gas by soil bacteria. (This process is known as denitrification.) The nitrate nitrogen is so easily lost from soil as described above that the rate of its utilization by plants is very low.

Thus, in order that the nitrogen in soil can be leached from the soil or lost by denitrification, it must be present as nitrate nitrogen. Therefore, in order to prevent the loss of nitrogen from soil and to improve the rate of utilization of nitrogen by plants, it is necessary to inhibit the nitrification of ammonium nitrogen by soil bacteria.

An object of the present invention is to provide an improved method of preventing the loss of soil nitrogen.

Another object of the present invention is to provide an improved method of inhibiting the nitrification of ammonium nitrogen in soil.

A further object of the present invention is to provide a new fertilizer composition.

According to the present invention we provide a method for inhibiting the nitrification of ammonium nitrogen in soil comprising treating soil in a plant growing area with a compound formed by reacting sulfathiazole with formaldehyde. Here formaldehyde can be used also in the form of a substance producing formaldehyde such as paraformaldehyde or hexamethylene tetramine instead of being used in the form of an aqueous solution of formaldehyde. It is preferable to carry out the reaction at a temperature of 15 to 75° C. in an acidic aqueous medium or an organic solvent. The thus-obtained compound is thought to correspond to the compound having the following formula:

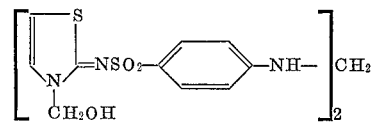

EXAMPLE 1

Preparation of the compound 100 g. of sulfathiazole were dissolved in 1000 ml. of 1 N hydrochloric acid and 50 ml. of 37% Formalin were dropped into the resulting solution while stirring rigorously. A reaction product was soon precipitated in the form of a fine crystal. The reaction product was separated by filtration, was washed with water and was dried at 75° C. 98 g. of a yellowish brown powdery substance were obtained.

The melting point of this compound was 265° C. (as accompanied with decomposition). The results of the elementary analysis were as follows:

Calculated values based on the fromula of $$C_{21}H_{22}O_6N_6S_4$$

43.28% C, 3.81% H, 14.42% N and 22.00% S.

Analysis values: 42.98% C, 3.96% H, 14.07% N and 22.12% S.

By the method of the present invention, the conversion of ammonium nitrogen in soil to nitrate nitrogen is inhibited and ammonium nitrogen can be prevented from being quickly lost from soil. This inhibiting action lasts for more than two months. The ammonium nitrogen in such case may derive from administered fertilizer containing ammonium nitrogen, for example, ammonia or ammonium salts, or any be formed by conversion of an organic nitrogen constituent in soil or by the conversion of organic fertilizer such as urea administered to soil.

In treating soil with the aforementioned compound, it is preferable to impregnate soil below the soil surface in a plant growing area with the compound so that the concentration of the compound in the soil is 1 to 150 parts by weight per million parts by weight of the soil. It is preferable that the amount of application of the compound is at least 5 grams per 1 are of the plant growing area.

The compound may be distributed on a plant growing area prior to, simultaneously with or subsequent to the administration of a nitrogen fertilizer. Further, when the soil is treated with the compound after the harvest of crops, ammonium nitrogen produced from organic substances in the soil can be preserved for the next growing season. And it is also possible to prevent the generation of the phytotoxic nitrogen oxide gas from the soil of the plant growing area in the vinyl house or glass house by treating the plant growing area with the compound.

In treating a plant growing area with the compound, the compound may be used as mixed with a soil treating adjuvent, for example, water, petroleum distillates, other organic solvent, surface active agent, finely powdered inert solid, reduced nitrogen fertilizer or a mixture thereof.

The concentration of the compound in such composition is not critical but can be made any amount below 95% of the composition. For the inert solid carrier, there may be used talc, chalk, gypsum, vermiculite, bentonite or diatomaceous earth.

A composition composed of the compound and a fertilizer is most desirable in practising the method of the present invention. Such composition may be produced by dispersing the compound in a reduced nitrogen fertilizer such as ammonia, ammonium salts or urea. Further, such composition may contain a phosphate and/or potassium salt. The reduced nitrogen fertilizer may be either solid or liquid.

It is preferable that the compound in such fertilizer composition is at least 0.5% by weight based on the weight of nitrogen present as reduced nitrogen in the fertilizer.

In practising the method of the present invention, soil may be treated with the compound or the composition containing it by any convenient methods. For example, the compound or the solid composition containing it may be mechanically mixed with the soil or may be distributed on the surface of the soil and then dragged or disced into the soil to a desired depth. The fertilizer composition including the compound can be administered in the same manner as of administering an ordinary fertilizer. Further, the liquid composition can be applied by spraying.

The following examples explain the present invention but are not construed as limiting. In the examples, the parts are by weight.

EXAMPLE 2

There were prepared a mixture (I) obtained by adding 0.05 part of the compound prepared according to Example 1 to 33 parts of urea and uniformly mixing them, a mixture (II) obtained by adding 0.5 part of the compound prepared according to Example 1 to 33 parts of urea and uniformly mixing them and a mixture (III) obtained by adding 5 parts of the compound prepared according to Example 1 to 33 parts of urea and uniformly mixing them. 50 g. of soil were uniformly mixed with each of 33 mg. of the mixture (I), 33.5 mg. of the mixture (II) and 38 mg. of the mixture (III). Each of the resulting mixtures contained 15 mg. of nitrogen per 50 g. of the soil. The concentration of the compound in the soil was 1 p.p.m., 10 p.p.m. and 100 p.p.m. respectively. Each of said mixtures was put into a conical flask of a capacity of 100 cc. Water was added thereto so that the water content in the soil was 60% of the maximum water capacity. The flask was plugged with cotton. The contents were incubated at 28° C. for 20 days. After the completion of the incubation, the nitrogen in the soil was analyzed in respective forms. Thus the results in Table 1 were obtained.

The same experiment as described above were carried out also on sodium pentachlorophenate which is a known nitrification inhibiting agent. Further, for comparison, there are shown the analysis values of nitrogen in the respective forms in case soil alone and 50 g. of soil with the addition of 33 mg. of urea were incubated in the same manner as in the above described experiment. The data are mean values of the duplication.

TABLE 1

| Compounds | Forms of nitrogen | Concentration of the compound in the soil | | |
|---|---|---|---|---|
| | | 1 p.p.m. | 10 p.p.m. | 100 p.p.m. |
| Compound of the present invention. | $NH_4$—N | 1.7 | 8.5 | 11.2 |
| | $NO_3$—N | 13.0 | 6.6 | 4.0 |
| Sodium pentachlorophenate. | $NH_4$—N | 1.0 | 5.2 | 9.9 |
| | $NO_3$—N | 14.2 | 10.1 | 5.2 |
| Urea only | $NH_4$—N | 0.2 | | |
| | $NO_3$—N | 15.0 | | |
| Soil only | $NH_4$—N | 0.1 | | |
| | $NO_3$—N | 0.2 | | |

EXAMPLE 3

5 parts of the compound prepared according to Example 1 and 95 parts of talc were uniformly mixed and ground. 5 parts of the resulting powder were mixed with 20 parts of ammonium sulfate uniformly. 90 mg. of the resulting mixture were well mixed with 50 g. of soil. The mixture was put into a conical flask of a capacity of 100 cc. Water was added to the mixture so that the water content in the soil was 60% of the water capacity. The flask was plugged with cotton. The contents were incubated at 28° C. for 20 days. The nitrogen in the soil was analzed in respective forms. The results were as in Table 2. The data are means values of the duplication. For comparison, there are also mentioned the results of incubation of the soil alone under the same conditions and of the soil with the addition of the same amount of ammonium sulfate as in the above described experiment under the same conditions.

TABLE 2

| Treating compositions | $NH_4$—N N in mg./ 50 g. of soil | $NO_3$—N N in mg./ 50 g. of soil |
|---|---|---|
| None (soil alone) | 0.1 | 0.5 |
| Ammonium sulfate | 1.2 | 13.1 |
| Ammonium sulfate plus compound of the present invention | 9.7 | 4.8 |

EXAMPLE 4

2 parts of the compound prepared according to Example 1, 20 parts of sodium dodecyl benzene sulfonate and 78 parts of xylene were mixed together to form an emulsifiable composition. 25 g. of this mixture were added to 100 cc. of water and were stirred to form an emulsion. 7.5 cc. of this emulsion were added to 1.2 liters of an aqueous solution of 1% monoammonium phosphate. 12 cc. of the thus-obtained solution were mixed with 50 g. of soil. The mixture was incubated at 28° C. for 20 days. The nitrogen in the soil was analyzed in respective forms. Thus the values shown in Table 4 were obtained. The data are mean values of the duplication. For comparison, there are also mentioned the results of incubation of the soil alone under the same conditions and of the soil with the addition of 12 cc. of an aqueous solution of 1% monoammonium phosphate under the same conditions.

TABLE 3

| Treating compositions | $NH_4$—N N in mg./ 50 g. of soil | $NO_3$—N N in mg./ 50 g. of soil |
|---|---|---|
| None (soil alone) | 0.1 | 0.5 |
| Monoammonium phosphate | 0.8 | 13.1 |
| Monoammonium phosphate plus compound of the present invention | 10.7 | 4.1 |

EXAMPLE 5

0.7 part of the compound prepared according to Example 1, 35.7 parts of monoammonium phosphate, 31.8 parts of urea and 31.6 parts of potassium chloride were pulverized and mixed together. The mixture was granulated in a rotating drum to form a granular fertilizer composition of a granule diameter of 1 to 3 mm.

This granular fertilizer composition was added to 50 g. of soil so as to obtain a bulk mixture containing 4.55 mg.

of nitrogen and was well mixed. A glass tube of an inside diameter of 23 mm. sealed at the lower end with filter paper and gauze was charged with the thus-obtained mixture and was buried in a field so that the upper end of the glass tube was flushed with the ground surface. On the 20th, 40th and 60th days after it was buried, the soil in the glass tube was analyzed and the remaining amount of nitrogen was measured. The results were as in Table 5. The data are mean values of the duplication. For comparison, there are also mentioned the results of the same operation as was described above on soil alone and on a mixture prepared by pulverized and mixing 35.7 parts of monoammonium phosphate, 31.8 parts of urea and 31.6 parts of potassium chloride, granulating the mixture in a rotating drum to form a granular fertilizer and mixing it in 50 g. of soil so that nitrogen in the soil was 4.55 mg.

TABLE 4

| Treating compositions | $NH_4-N$ N in mg./ 50 g. of soil | $NO_3-N$ N in mg./ 50 g. of soil |
|---|---|---|
| 20th day | | |
| None (soil alone) | 0.1 | 0.1 |
| Granular fertilizer | 3.0 | 1.1 |
| Granular fertilizer containing the compound of the present invention | 4.3 | 0.0 |
| 40th day | | |
| None (soil alone) | 0.1 | 0.3 |
| Granular fertilizer | 1.5 | 1.6 |
| Granular fertilizer containing the compound of the present invention | 3.4 | 0.1 |
| 60th day | | |
| None (soil alone) | 0.1 | 0.0 |
| Granular fertilizer | 0.4 | 0.5 |
| Granular fertilizer containing the compound of the present invention | 2.9 | 0.2 |

EXAMPLE 6

5 parts of the compound prepared according to Example 1 and 95 parts of talc were mixed and then ground to produce 100 parts of a dust composition.

EXAMPLE 7

5 parts of the compound prepared according to Example 1 were mixed with 318 parts of urea, 357 parts of ammonium phosphate (of 12% N and 53% $P_2O_5$) and 316 parts of potassium chloride. The resulting mixture was granulated in a rotating drum while spraying a small amount of water and was dried to produce 996 parts of a granular fertilizer composition.

EXAMPLE 8

1 part of the compound prepared according to Example 1 was mixed with 99 parts of crystal urea. A small amount of water was given to the resulting mixture. The mixture was kneaded at a temperature of 50 to 60° C., was extruded through small orifices of 2 mm. in diameter and was dried to produce 100 parts of a product.

EXAMPLE 9

30 parts of the compound prepared according to Example 1, 10 parts of sodium dodecyl benzene sulfonate and 60 parts of diatomaceous earth were mixed together and ground to produce 100 parts of a wettable powder.

EXAMPLE 10

8 parts of the compound prepared according to Example 1, 80 parts of dimethyl formamide and 12 parts of Emanone 1112 (trade name) as an emulsifier were mixed to produce 100 parts of an emulsifiable concentrate.

In this invention, the expression "reduced nitrogen fertilizers" means fertilizers containing nitrogen in the reduced state including ammonia, ammonium salts and organic compounds readily convertible in the soil to ammonia or ammonium salts such as urea and cyanamide.

What is claimed is:

1. A method for inhibiting the nitrification of ammonium nitrogen in soil and preventing rapid loss of ammonium nitrogen therefrom comprising treating the soil in a plant growing area with a compound formed by reacting sulfathiazole with formaldehyde.

2. A method for inhibiting the nitrification of ammonium nitrogen in soil and preventing rapid loss of ammonium nitrogen therefrom comprising treating the soil in a plant growing area in a concentration sufficient to inhibit the nitrification with a composition comprisng a compound formed by reacting sulfathiazole with formaldehyde in intimate admixture with a soil treating adjuvant, said concentration being from about 1 to 150 parts by weight per million parts by weight of soil.

3. A method according to claim 2 wherein said soil treating adjuvant is a reduced nitrogen fertilizer selected from the group consisting of ammonia, ammonium salts and urea.

4. A fertilizer composition comprising a reduced nitrogen fertilizer selected from the group consisting of ammonia, ammonium salts and urea and a compound formed by reacting sulfathiazole with formaldehyde.

5. A fertilizer composition according to claim 3 wherein said compound is present in a concentration of at least 0.5 percent by weight based on the weight of the reduced nitrogen in said reduced nitrogen fertilizer.

References Cited

UNITED STATES PATENTS 2,512,102  6/1950  Hartmann et al. __ 260—239.95

OTHER REFERENCES

Soil Science, Antibiotics in Soils, vol. 91–401, 1961, pp. 22–28.

REUBEN FRIEDMAN, Primary Examiner

C. N. HART, Assistant Examiner

U.S. Cl. X.R.

71—61, 64